United States Patent
Klemets et al.

(10) Patent No.: US 10,303,692 B2
(45) Date of Patent: May 28, 2019

(54) AUTOMATIC SELECTION OF MEDIA REPRESENTATIONS

(71) Applicant: MICROSOFT TECHNOLOGY LICENSING, LLC, Redmond, WA (US)

(72) Inventors: Anders E Klemets, Redmond, WA (US); Kevin P Larkin, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/602,934

(22) Filed: Jan. 22, 2015

(65) Prior Publication Data
US 2015/0134674 A1    May 14, 2015

Related U.S. Application Data

(63) Continuation of application No. 12/144,629, filed on Jun. 24, 2008, now Pat. No. 8,965,903.

(51) Int. Cl.
*G06F 17/30* (2006.01)
*G06F 16/41* (2019.01)
*G06F 16/2457* (2019.01)
*G06F 16/48* (2019.01)
*G06F 16/58* (2019.01)
*G06F 16/68* (2019.01)
*G06F 16/70* (2019.01)

(52) U.S. Cl.
CPC ........ *G06F 16/24578* (2019.01); *G06F 16/41* (2019.01); *G06F 16/48* (2019.01); *G06F 16/58* (2019.01); *G06F 16/68* (2019.01); *G06F 16/70* (2019.01)

(58) Field of Classification Search
CPC ......... G06F 17/30038; G06F 17/30265; G06F 17/3053; G06F 17/30781; G06F 17/30749; G06F 17/3002; G06F 16/41
See application file for complete search history.

(56) References Cited

U.S. PATENT DOCUMENTS

| | | | |
|---|---|---|---|
| 5,892,915 | A | 4/1999 | Duso et al. |
| 6,490,627 | B1 | 12/2002 | Kalra et al. |
| 7,103,681 | B2 | 9/2006 | Coulombe |
| 7,110,993 | B2 | 9/2006 | Soulanille et al. |
| 7,296,295 | B2 | 11/2007 | Kellerman et al. |
| 7,356,525 | B2 | 4/2008 | Cipriano et al. |

(Continued)

OTHER PUBLICATIONS

"DLNA Interoperability Guidelines and Media Formats Adopted as IEC International Standards" Oct. 2, 2007, from www.dlna.org/news.
Schulzrinne, et al., "Real Time Streaming Protocol Memo", Apr. 1998, Network Working Group, the Internet Society.
Yu, et al., "Supporting Context-Aware Media Recommendations for Smart Phones", Pervasive Computing, IEEE CS and IEEE ComSoc, Jul.-Sep. 2006, pp. 68-75.

(Continued)

*Primary Examiner* — Robert W Beausoliel, Jr.
*Assistant Examiner* — Nirav K Khakhar
(74) *Attorney, Agent, or Firm* — Mark K. Young; Mayer & Williams PC (57) ABSTRACT

Technologies for selecting a media representation out of a plurality of representations of the same media offered by a media provider wherein the selected representation is a preferred representation and the selecting is based on metadata of the media representations evaluated against scoring criteria.

20 Claims, 5 Drawing Sheets

(56) References Cited

U.S. PATENT DOCUMENTS

| | | | |
|---|---|---|---|
| 7,519,702 B1 * | 4/2009 | Allan | G06F 15/173 709/201 |
| 7,725,465 B2 | 5/2010 | Liao et al. | |
| 7,730,060 B2 | 6/2010 | Chakrabarti et al. | |
| 7,797,635 B1 | 9/2010 | Denise | |
| 2001/0047517 A1 | 11/2001 | Christopoulos et al. | |
| 2004/0054689 A1 | 3/2004 | Salmonsen et al. | |
| 2004/0111453 A1 * | 6/2004 | Harris | G06K 9/6269 708/200 |
| 2004/0243694 A1 | 12/2004 | Weast | |
| 2004/0243700 A1 | 12/2004 | Weast | |
| 2005/0132264 A1 | 6/2005 | Joshi et al. | |
| 2005/0204393 A1 | 9/2005 | Bopardikar et al. | |
| 2006/0117379 A1 | 6/2006 | Bennett et al. | |
| 2007/0237090 A1 | 10/2007 | Kim et al. | |
| 2007/0294372 A1 | 12/2007 | Hlasny et al. | |
| 2008/0126303 A1 | 5/2008 | Park et al. | |
| 2010/0306411 A1 | 12/2010 | Zhang et al. | |

OTHER PUBLICATIONS

Hossain, et al., "Multimedia Content Repurposing in Heterogeneous Network Environments", International Conference on Electrical and Computer Engineering, ICECE' 06, Dec. 19-21, 2006, pp. 4.

Sung, et al., "UPnP Based Intelligent Multimedia Service Architecture for Digital Home Network", Proceedings of the Fourth IEEE Workshop on Software Technologies for Future Embedded and Ubiquitous Systems and Second International Workshop on Collaborative Computing, Integration, and Assurance (SEUS-WCCIA'06), IEEE Computer Society, IEEE, Apr. 27-28, 2006, pp. 6.

Park, et al., "A Transparent Protocol Scheme Based on UPnP AV for Ubiquitous Home", vol. 4743, Springer-Verlag, Sep. 2007, pp. 153-162.

Hu, et al., "Mobile Media Content Sharing in UPnP-Based Home Network Environment", In Journal of Information Science and Engineering, vol. 24, Issue 6, Nov. 2008, pp. 1753-1769.

* cited by examiner

AUTOMATIC SELECTION OF MEDIA REPRESENTATIONS

RELATED APPLICATION(S)

This Application is a Continuation of, and claims benefit from, U.S. patent application Ser. No. 12/144,629 that was filed on Jun. 24, 2008, and that is incorporated herein by reference in its entirety.

BACKGROUND

In recent years, new consumer electronics devices have been introduced that can connect to networks such as Local Area Networks ("LANs") and the like. Examples of such devices include printers, Digital Video Disk ("DVD") players, personal video recorders, etc. For it to be useful to connect a device, such as a printer, to a network, the device must be able to communicate with other devices on the network. There should be a common "language" or protocol that the devices can use to talk to each other, and a simple way for devices to find each other with as little human intervention as possible. Conventional Universal Plug and Play ("UPnP") provides for most of these needs.

UPnP defines a category of devices called Media Servers, and another category called Media Renderers, and a concept called a Control Point. A Control Point is an entity which can find UPnP devices and control them. UPnP Media Server devices typically transfer multimedia content (e.g., a digital representation of a movie) to a Media Renderer device. For example, a networked DVD player may be a Media Renderer and a PC-based server maybe a Media Server. The networked DVD player may have a built-in Control Point, which allows it to discover the Media Server and allows it to download a catalog of movies from the Media Server. The Control Point may initiate a streaming transfer of one the movies from the Media Server to the Media Renderer so that it can be shown on a screen (e.g., a TV set) that the Media Renderer is attached to.

UPnP does not specify the format of the multimedia content (the movie in the previous example). However, UPnP does specify how a Media Server device can offer multiple representations of the same content, allowing the Control Point to choose a representation which is suitable for the Media Renderer. For example, the networked DVD player might only be able to play movies which are encoded using Moving Picture Experts Group ("MPEG")-2 compression. If a movie file which is stored on the server s encoded using Windows Media Video ("WMV") compression, then the DVD player will only be able to play the movie if the server can offer the movie in MPEG-2 format. Converting the movie from one format to another is called "transcoding". The quality of the images (or sound) that has been transcoded can be inferior to that of the original non-transcoded content.

In the general case, a Media Renderer might support multiple formats, and a Media Server may offer a movie in several different formats. There may be only partial overlap between the set of formats offered and the set of formats supported by the Media Renderer. It is possible for a Media Server to offer multiple representations of the same content, and each representation might be encoded using the same compression format and only differ by the width and height, or only differ by the encoding bit rate, etc.

Although it would be possible for a Media Renderer to initiate the transfer of multiple media representations until it find one that works, such an approach can be time consuming and may not result in the best user experience. For example, the first representation that "works" might be encoded using a very low bit rate, resulting in a lower than necessary image quality.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for selecting a media representation out of a plurality of representations of the same media offered by a media provider wherein the selected representation is a preferred representation and the selecting is based on metadata of the media representations evaluated against scoring criteria.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
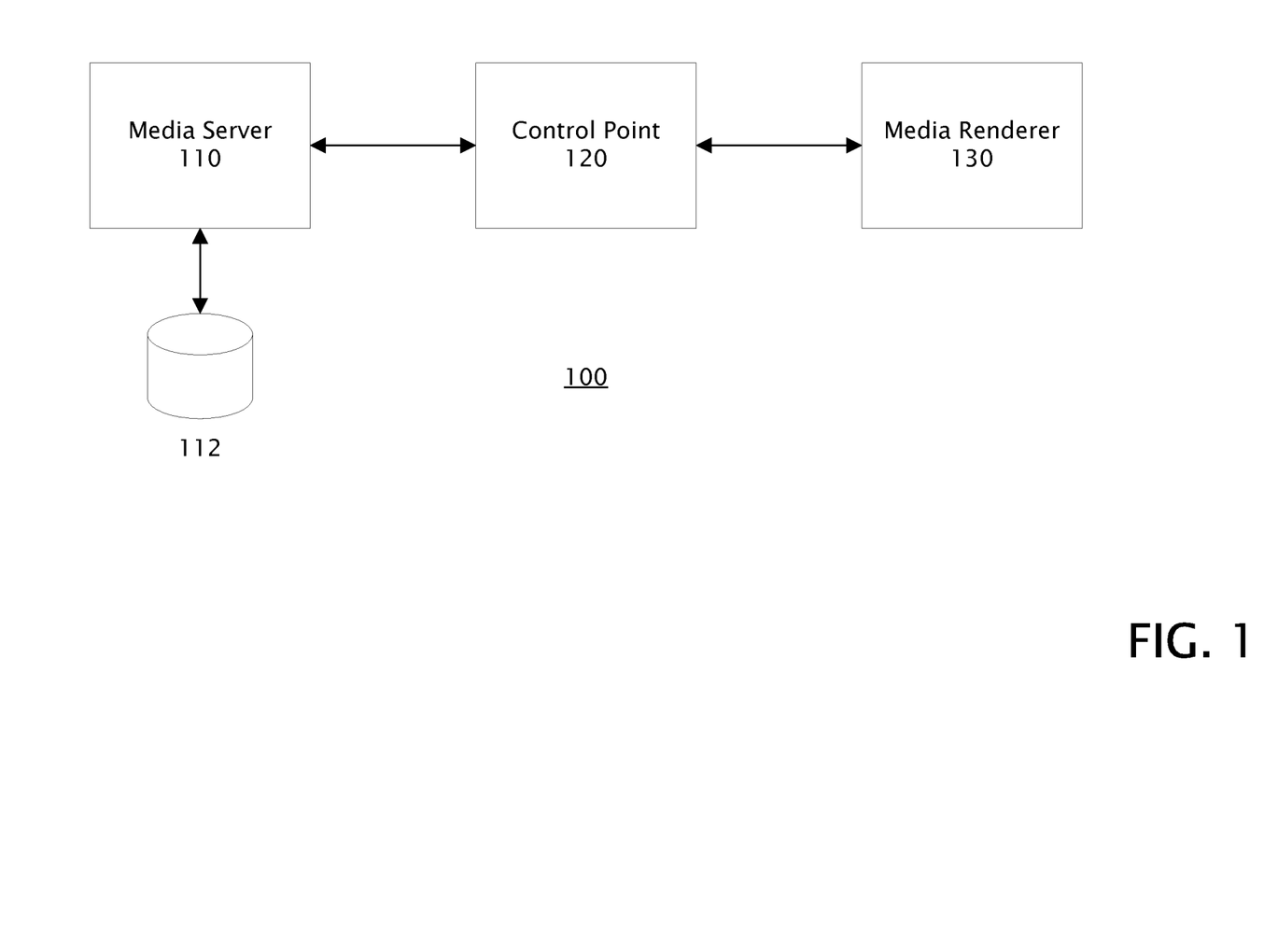
FIG. 1 is a block diagram showing an example media system.

FIG. 1 is a block diagram showing an example media system 100. Such a media system typically serves media from a Media Server 110 or the like, that may be stored in a data store 112 coupled to Media Server 110. The served media may be rendered on A Media Renderer 130 or the like. A Control Point 120 may operate to determine what media is available via the Media Server 110 and provide a selection of the available media to Media Renderer 130 for rendering. In one example, media system 100 may be based on the Universal Plug and Play ("UPnP") standard. Data store 112 may be one or more storage devices or the like operable to store digital media and or information about the digital media including metadata, catalogs, and the like. The Device or devices forming data store 112 may be distinct from and/or part of Media Server 110.

A Media Server 110 may also be referred to as a Digital Media Server ("DMS") or media provider and may be any device or system operable to store and/or provide digital media to media players and renderers such as Media Renderer 130. Examples of Media Server 110 include Personal Computers ("PCs"), servers, Network Attached Storage ("NAS") devices, etc.

A Media Renderer 130 may also be referred to as a Digital Media Renderer ("DMR") or a Digital Media Player ("DMP") or media player and may be any device or system operable to render and/or play digital media. Examples of Media Renderer 130 include televisions ("TVs"), stereos, home theatres, game consoles, video displays, remote speakers, etc. The term "target renderer" as used herein typically refers to a particular renderer that some media representation is to be rendered by. For example, a person's DVD player may be the target renderer for some representation of a digital video to be watched by the person.

A Control Point may also be referred to as a Digital Media Controller ("DMC") and may be any device operable to find media on Media Servers or the like and play the media on Media Renderers or the like. Control Point 120 may be included as an element of Media Renderer 130. For example, Control Point 120 may be included in a digital camera, PC, personal digital assistant ("PDA"), networked DVD player, networked music player, media player, etc.

The term "media" or "digital media" as used herein typically refers to digitized audio, video, images, or the like, or any combination thereof. The term "a media" typically refers to a specific image, video, audio, media composition, or the like. Generally a particular digital media is embodied as a computer file or files. Such a media is typically "coded" or "encoded" or "compressed" in some digital "format" such as, for example, the Moving Picture Experts Group ("MPEG") format or the Windows Media Video ("WNW") format or the like. Many different formats are available for encoding media and any such format is typically supported by the examples provided herein. Examples of media include a digital picture or photograph, a movie on a DVD, or a song on a Compact Disk ("CD"), etc. A "representation" of a media typically includes the media and may further embody media characteristics including a particular encoding bit rate, a particular height and width, and indication as to whether or not the representation has been transcoded, the name (or other identifier) of the encoding format used to create the representation, protocols support for transferring the representation, etc. Other characteristics may alternatively or additionally be embodied in a representation of a media. Some or all of these media characteristics may be referred to herein as "media metadata" or "metadata". Such metadata may be available in connection with a media (e.g., as part of a media file) or independent of the media (e.g., as part of a catalog or the like of available media).

Another example characteristic of a media representation is a conventional Digital Living Network Alliance ("DLNA") Profile Identifier ("ID"). A DLNA Profile ID may specify and/or describe several media characteristics such as those described above and/or including encoding format, frame rate, bit rate, etc.

The term "transcoding" as used herein typically refers to the convention process of converting a media from one format to another. For example, a digital audio media may be transcoded from Windows Media Audio ("WMA") format to MP3 format (MPEG-1 Audio Layer 3, or "MP3"). Such digital-to-digital conversion is typically lossy and typically results in a transcoded media of lesser quality than the original. On the other hand, transcoded media may be much smaller in size (number of bytes) than the original media, thus easier to store and/or transfer.

Figure 2:
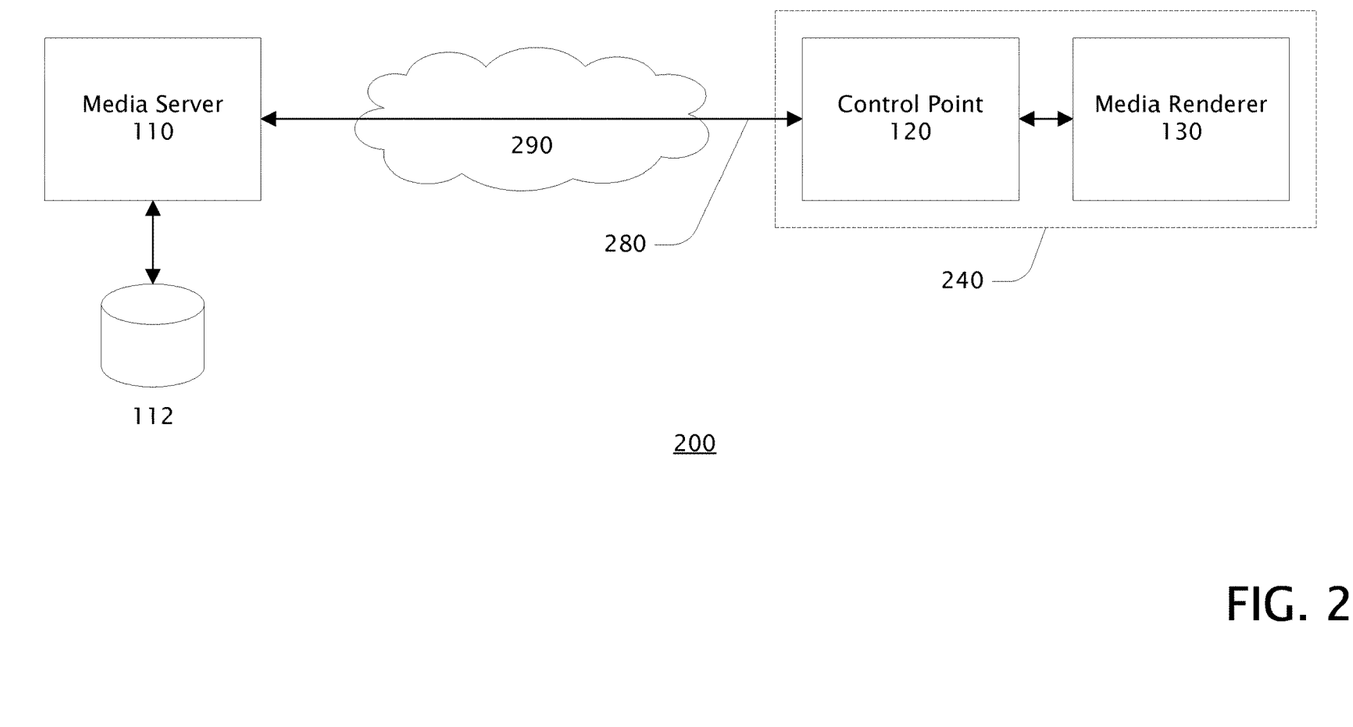
FIG. 2 is a block diagram showing another example media system.

FIG. 2 is a block diagram showing another example media system 200. Media system 200 may be comprised of the some Media Server 110, Data store 112, Control Point 120, and Media Renderer 130 as shown in FIG. 1, but may be coupled differently. For example, Control Point 120 and Media Renderer 130 may be combined into a single networked media device 240 such as a networked DVD player or the like. Device 240 may further be coupled to Media Server 110 via a link 280 over a network 290 such as the Internet, a wireless network, a wide area network ("WAN") or any other combination or type of network. Link 280 ("link") includes a data throughput characteristic in this case a rate at which the link can transfer data from Media Server 110 to Media Renderer 130. Such a data throughput rate may be critical to know prior to selecting a media for rendering. For example, if the data throughput rate of link 280 ("link data throughput rate") is 128 kilobits per second ("kbs"), and the encoding bit rate of the selected representation is greater than 128 kbs, then attempting to stream the selected representation over link 280 for rendering will likely result in a poor rendering quality. The data throughput rate may not be of concern in a typical wired network or a high-speed wireless network. But the data throughput rate may be an issue with other types of networks including the Internet.

Figure 3:
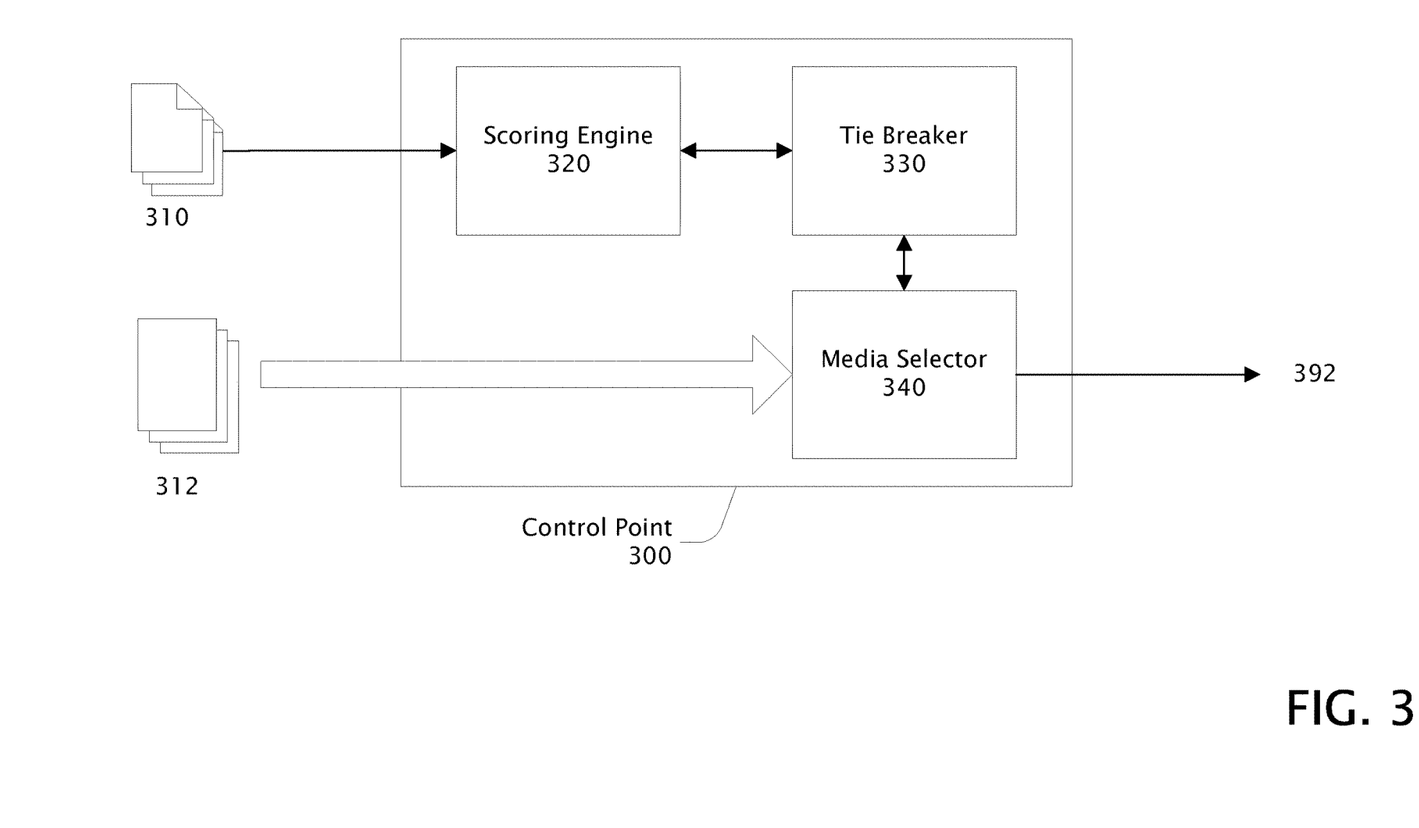
FIG. 3 is a block diagram showing an example Non-conventional Control Point including elements for selecting a preferred representation of a media.

FIG. 3 is a block diagram showing an example Non-conventional Control Point ("NCP") 300 including elements 320, 330, and 340 for selecting a preferred representation of a media. Such a selecting of a preferred representation may help avoid some of the limitations described in the Background section herein above.

Scoring Engine 320 is an example scoring means for calculating and assigning a score to a media based on metadata corresponding to the media. The scoring means may be implemented as a hardware module or the like, a software module or the like, some combination of the two, or in any other suitable fashion. In one example, Scoring Engine 320 is implemented as a software module that is a part of Control Point 300. Alternatively, Scoring Engine 320 may be implemented distinct from Control Point 300 and/or any of the other elements shown in FIG. 3.

Scoring Engine 320 typically accepts as input metadata 310 for each corresponding media 312. Such metadata and media may be provided by a media provider or the like, such as Media Server 110 of FIGS. 1 and 2. Each media representation of Media 312 is typically associated with a corresponding metadata of Metadata 310. Media 312 may include representations of media with corresponding metadata 310 being a part of the representations and/or distinct from the representations. Metadata 310 may be provided as a part of a "catalog" or "play list" or the like, typically listing available media representations and including at least some of their characteristics.

Scoring Engine 320 typically evaluates the metadata for each corresponding media representation of a set of available media representations 312 and assigns a score to each available media representation based on the corresponding metadata. The score may be associated with the corresponding media representation, the corresponding metadata, and/or maintained in any other suitable manner by Scoring Engine 320, including storing the score in the metadata.

Generally the set of media representations ("media representations") are each a different representation of the same media. For example, a particular digital picture may be available in various resolutions, some higher and some lower each a representation of the same picture. Or a digital song may be available in various representations, some with higher encoding bit rates, some with lower, some transcoded, and some not—each a representation of the same digital song. Or a digital video may be available in various representations, some with larger image height/width, some with smaller, some transcoded, and some not—each a representation of the same digital video. Many other variations are additionally or alternatively possible for the different representations of a particular digital media. As used herein, a set of media representations typically refers to various representations of the same digital media. A different representation of a particular media may be preferable for a variety of reasons including link data throughput rate, renderer capabilities, etc., generally with the goal of selecting the highest quality media representation possible for a given link and renderer and the like.

A typical media provider may be operable to provide many different sets of media representations. For example, one media provider may provide hundreds of digitized songs with many of the songs having perhaps several different representations (a set of representations of the particular digital media). Some of the different representations may be preferred by one type of media renderer and other representations may be preferred by another type of media renderer, typically depending on the various characteristics of the different representations.

The assigned score typically indicates that a media representation satisfies certain scoring criteria ("criteria" or, in the singular, "criterion"). Assigned scores may be used to rank media representations of a set with such a ranking being the basis for selecting a preferred media representation. In particular, a media representation that satisfies a single higher-level criterion will always receive a score that outranks a media representation that only satisfies any combination of lower-level criteria.

In one example, the highest level criterion is the encoding bit rate of a media representation being less than the data throughput rate of the link from the media provider, such as link 280 of FIG. 2. Such a criterion contributes to insuring a high-quality rendered of a preferred media representation. In this example, a second-level criterion is whether or not a media representation has been transcoded. Non-transcoded media representations generally provide a high quality rendering than transcoded media representations, thus a media representation that has not been transcoded will typically rank higher than one that has been transcoded. Considering these two criteria together, a media representation that has been encoded at a bit rate less than the link data throughput rate (thus allowing for real-time playback), regardless of whether or not it is transcoded, will be selected as a preferred media representation. Further, such a media representation will be assigned a higher score if it is not transcoded, a lower score if it is transcoded. This is because the loss in quality caused by not being able to play the media in real-time generally outweighs the loss in quality caused by transcoding, and because loss in quality due to transcoding is generally higher than with a representation of the media that has not been transcoded.

In one example, a value is assigned to each criterion, each value selected so that the sum of all lower values does not exceed the next higher value, as illustrated using hexadecimal notation for Score Values in Table 1.

TABLE 1

| Score Value | Scoring Criteria |
| --- | --- |
| 0x08000000 | Encoding bit rate of media representation is less than link data throughput rate. |
| 0x04000000 | Media representation is not transcoded. |
| 0x02000000 | DLNA Profile ID of media representation is supported by renderer. |
| 0x01000000 | MIME[1] content type of media representation is supported by renderer (no DLNA Profile ID available). 1. The abbreviation MIME stands for Multipurpose Internet Mail Extensions ("MIME") as defined by the internet Engineering Task Force ("IETF") and typically refers herein to an Internet Media Type. |
| 0x00800000 | Media representation is video media; and the RTSP[2] protocol is supported; and the media provider supports seeking. 2. The abbreviation RTSP stands for Real Time Streaming Protocol ("RTSP") as developed by the IETF. |
| 0x00400000 | Media representation is video or audio media; and the media provider supports seeking to a byte position. |
| 0x00200000 | Media representation is video or audio media; and the media provider supports seeking to a time position. |
| 0x00100000 | Media representation is video media; and the RTSP protocol is supported; and the media provider does not support seeking. |
| 0x00080000 | Media representation is not video media; and the HTTP[3] protocol is supported. 3. The abbreviation HTTP stands for Hypertext Transfer Protocol ("HTTP") as developed by the World Wide Web Consortium ("W3C") and the IETF. |

In other examples, other criteria to that shown in Table 1 could additionally or alternatively be used. Further, an alternate ordering of criteria by value could be used. The ordering by value assigned to the criteria is important. In particular, the criteria that are considered to have the greatest negative impact on quality of rendering if not satisfied are assigned the highest values and thus provide the greatest contribution to the overall score of a media representation.

A scoring criteria table or the like, such as that shown in Table 1, may be maintained by Scoring Engine 320 or, additionally or alternatively, by media renderers. If such a criteria table is maintained by media renderers, then the criteria table (or the information in it) may be provided to Scoring Engine 320 to facilitate scoring of media representations, thus overriding and/or supplementing any criteria table or the like that may be maintained by Scoring Engine 320.

Scoring Engine 320 typically evaluates the metadata of a particular media representation and assigns a score to that representation based on how it satisfies the criteria. Generally all media representations of a provided set are scored. In one example, the score is a sum of the Score Values listed in Table 1 for the criteria satisfied by the media representation. For example, given a first video media representation that is transcoded using a bit rate that is less than the link data throughput rate, and which has a DLNA Profile ID that is supported by the target renderer, and that uses the HTTP protocol, a score of 0x0A000000 is assigned by Scoring Engine 320, which equals 0x08000000 plus 0x02000000, representing the only two criteria satisfied in this example.

In the above example, the target renderer may prefer to use the RTSP protocol for transferring video media. If a second video media representation is available that is transcoded using a bit rate that is less than the link data throughput rate, but that supports RTSP and seeking, then the score for this second video media representation would be 0x08800000. Even so, the first video media representation would be selected as the preferred media representation due to the higher score of 0x0A000000 because it includes the DLNA Profile ID that is supported by the target renderer, a criterion that is ranked higher (more important) than support for the RTSP protocol.

It is possible for two or more different media representation to be assigned the same highest score, or equal highest scores, typically because they satisfy the same scoring criteria. If this occurs, then Tie Breaker 330 breaks the tie between the equally-scored media representations. Tie Breaker 330 is an example tie breaker means for breaking ties between media representations that are assigned the same score by Scoring Engine 320. The tie breaker means may be implemented as a hardware module or the like, a software module or the like, some combination of the two, or in any other suitable fashion. In one example, Tie Breaker 330 is implemented as a software module that is a part of Control Point 300 or Scoring Engine 320. Alternatively, Tie Breaker 320 may be implemented distinct from Control Point 300 and/or any of the other elements shown in FIG. 3.

In one example for video media representations and image media representations, Tie Breaker 330 typically selects from the tied video or image representations (two or more with equal highest scores) the one with the largest number of pixels. The number of pixels is typically calculated as the product of the width and height of the video or image window, generally using conventional methods. If there are multiple representations with the same (largest) number of pixels, then Tie Breaker 330 typically selects from those so tied the image with the largest number of bytes in the image file, or the video with the highest encoding bit rate. If ties are still present, Tie Breaker 330 typically randomly selects a media representation from among those still tied.

In another example for audio media representations, Tie Breaker 330 typically selects from the tied representations (two or more with equal highest scores) the one with the largest number of audio channels. So, for example, surround sound is preferred over stereo, and stereo is preferred over mono. If there are multiple representations with the same largest number of audio channels, the Tie Breaker 330 typically selects from those so tied the representation encoded with the highest bit rate. If ties are still present, Tie Breaker 330 typically randomly selects a media representation from among those still tied.

Once a tie has been resolved, if a tie resulted from the scoring, then the selected media (selected based on the metadata either through scoring, or through scoring and tie breaking) is identified to Media Selector 340, an example selecting means for selecting among a set of media representations 312 the representation preferred for rendering based on the scoring and tie breaking. The selecting means may be implemented as a hardware module or the like, a software module or the like, some combination of the two, or in any other suitable fashion. In one example, Media Selector 340 is implemented as a software module that is a part of Control Point 300 or Scoring Engine 320 or Tie Breaker 330. Alternatively, Media Selector 340 may be implemented distinct from Control Point 300 and/or any of the other elements shown in FIG. 3.

Media Selector 340 typically receives an indicator from Tie Breaker 330 identifying the media representation of a set of media representations selected as the preferred media representation. In one example, Media Selector 340 selects the preferred media representation from the set of media representations 312 based on the indicator provided by Tie Breaker 330 for rendering by a target renderer, as indicated by arrow 392.

Media Selector 340 may additionally or alternatively be used to select a preferred metadata of the set of metadata 310 wherein the preferred metadata corresponds to the selected media representation indicated by Tie Breaker 330. In one example, the preferred metadata may then be stored as part of a catalog or playlist or the like of preferred media representations. In this manner, storage space is reduced by storing only metadata for preferred/selected media representations as opposed to metadata for each representation of the set of media representations for all sets of media representations provided by a media provider.

In another example, a target renderer may be unable to determine conclusively, based solely on the scoring criteria and tie breaking, that it can successfully renderer the preferred media representation. In this example, the renderer may attempt to render the preferred (highest or first ranked) media representation. If the target renderer is unsuccessful in its attempt to render the first-ranked media representation, then it may attempt to render the second-ranked media representation, and so forth, until it identifies a media representation in ranked order that is can render successfully, or runs out of representations to try. In such a scenario, suitable interfaces and/or functionality or the like are provided by elements 300, 320, 330, and/or 340 to enable a target renderer to perform the operations of this scenario.

Figure 4:
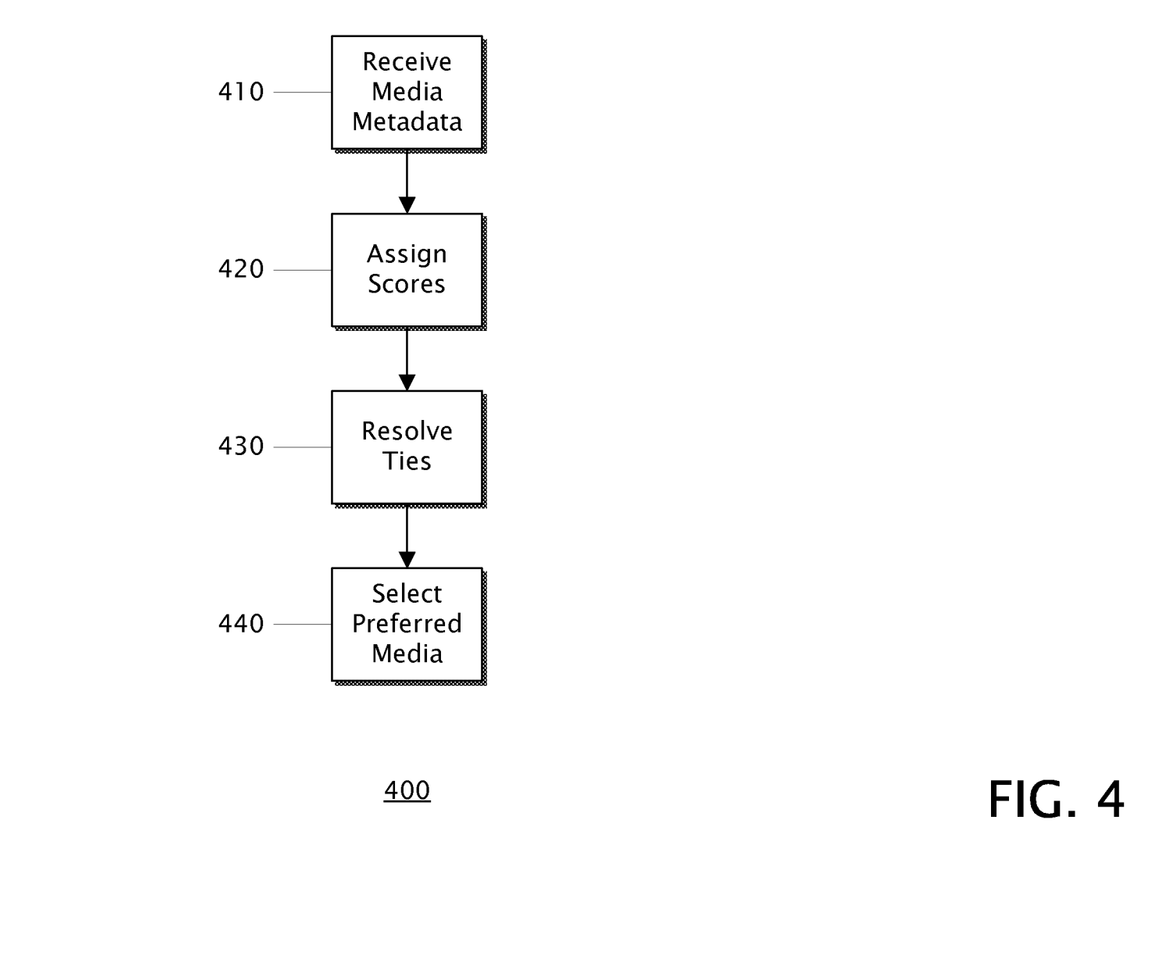
FIG. 4 is a block diagram showing an example method for selecting a preferred media representation from a set of media representations.

FIG. 4 is a block diagram showing an example method 400 for selecting a preferred media representation from a set of media representations. Method 400 may be performed by a control point or the like, such as Control Point 300 of FIG. 3. Alternatively, method 400 may be performed by a media renderer that includes means such as means 320, 330, and 340 of FIG. 3. Method 400 typically selects a preferred media representation from a set of media representations based on metadata corresponding to the media representations, and scoring criteria and tie breaking should multiple media representations be ranked highest.

Block 410 typically indicates receiving media metadata. In general, metadata is received corresponding to each media representation in a set of media representations of a particular media. Some examples of metadata and media are described herein above in connection with FIG. 1. Once the metadata is received, then method 400 typically continues at block 420.

Block 420 typically indicates ranking the media representations of the set by assigning a score to each representation. Such scoring is typically based on scoring criteria, such as that described in connection with FIG. 3. Such scoring is typically performed by a scoring means such as that described in connection with FIG. 3. A preferred media representation from the set may be selected based on the scoring, which is typically the highest ranking representation, or the representation with the highest score. If multiple representations are assigned the same score, then tie breaking may be required to select a preferred media representation. Once the scoring is performed, then method 400 typically continues at block 430.

Block 430 typically indicates resolving any ties wherein two or more media representations where assigned the same score. Such tie breaking is typically performed by a tie breaking means such as that described in connection with FIG. 3. Once tie breaking is performed, as needed, an indicator is generally provided identifying the preferred media representation, and then method 400 typically continues at block 440.

Block 440 typically indicates selecting the preferred media representation from the set of media representations based on an indication of the preferred media representation. Such representation selecting may be performed for multiple sets of media representations. Preferred representations(s) may be made available to a target renderer for rendering. Alternatively, or additionally, block 440 may indicate selecting a preferred metadata corresponding to the preferred media representation. Such metadata selecting may be performed for multiple sets of media representations. Preferred metadata may be made available for cataloging or listing or the like corresponding preferred media representations(s). Examples of such selection are described herein above in connection with FIG. 3. Once the selecting is complete, then method 400 is typically complete.

Figure 5:
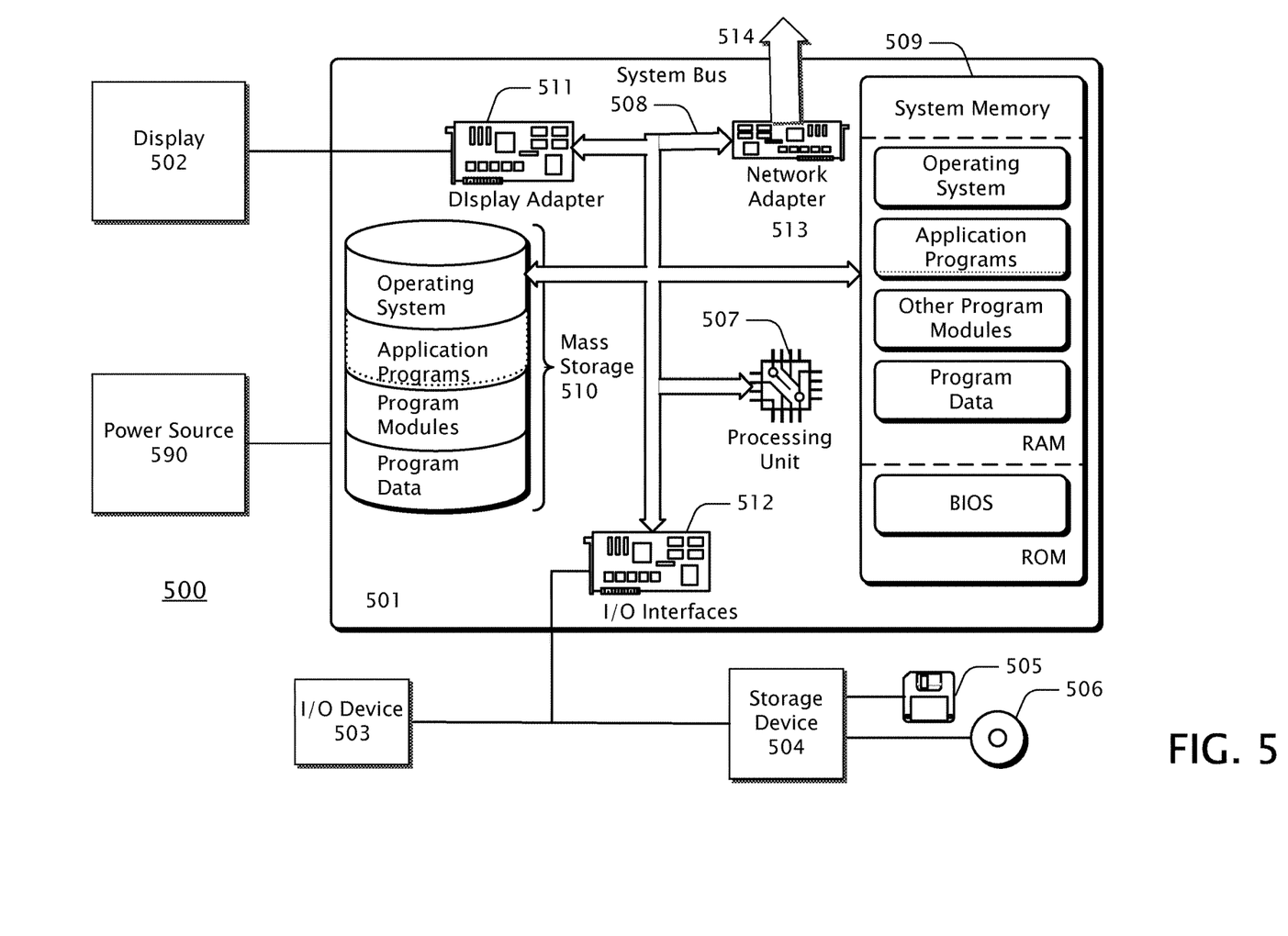
FIG. 5 is a block diagram showing an example computing environment in which the technologies described herein may be implemented.

FIG. 5 is a block diagram showing an example computing environment 500 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 500 typically includes a general-purpose computing system in the form of a computing device 501 coupled to various components, such as peripheral devices 502, 503, 504 and the like. System 500 may couple to various other components, such as input devices 503, including voice recognition, touch pads, buttons, keyboards and/or pointing devices, such as a mouse or trackball, via one or more input/output ("I/O") interfaces 512. The components of computing device 501 may include one or more processors (including central processing units ("CPU"), graphics processing units ("GPU"), microprocessors ("µP"), and the like) 507, system memory 509, and a system bus 508 that typically couples the various components. Processor 507 typically processes or executes various computer-executable instructions to control the operation of computing device 501 and to communicate with other electronic and/or computing devices, systems or environment (not shown) via various communications connections such as a network connection 514 or the like. System bus 508 represents any number of several types of bus structures, including a memory bus or memory controller, a peripheral bus, a serial bus, an accelerated graphics port, a processor or local bus using any of a variety of bus architectures, and the like.

System memory 509 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 509 typically stores data, computer-executable instructions and/or program modules comprising computer-executable instructions that are immediately accessible to and/or presently operated on by one or more of the processors 507.

Mass storage devices 504 and 510 may be coupled to computing device 501 or incorporated into computing device 501 via coupling to the system bus. Such mass storage devices 504 and 510 may include non-volatile RAM, a magnetic disk drive which reads from and/or writes to a removable, non-volatile magnetic disk (e.g., a "floppy disk") 505, and/or an optical disk drive that reads from and/or writes to a non-volatile optical disk such as a CD ROM, DVD ROM 506. Alternatively, a mass storage device, such as hard disk 510, may include non-removable storage medium. Other mass storage devices may include memory cards, memory sticks, tape storage devices, and the like.

Any number of computer programs, files, data structures, and the like may be stored in mass storage 510, other storage devices 504, 505, 506 and system memory 509 (typically limited by available space) including, by way of example and not limitation, operating systems, application programs, data files, directory structures, computer-executable instructions, and the like.

Output components or devices, such as display device 502, may be coupled to computing device 501, typically via an interface such as a display adapter 511. Output device 502 may be a liquid crystal display ("LCD"). Other example output devices may include printers, audio outputs, voice outputs, cathode ray tube ("CRT") displays, tactile devices or other sensory output mechanisms, or the like. Output devices may enable computing device 501 to interact with human operators or other machines, systems, computing environments, or the like. A user may interface with computing environment 500 via any number of different I/O devices 503 such as a touch pad, buttons, keyboard, mouse, joystick, game pad, data port, and the like. These and other I/O devices may be coupled to processor 507 via I/O interfaces 512 which may be coupled to system bus 508, and/or may be coupled by other interfaces and bus structures, such as a parallel port, game port, universal serial bus ("USB"), fire wire, infrared ("IR") port, and the like.

Computing device 501 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 501 may be coupled to a network via network adapter 513 or the like, or, alternatively, via a modem, digital subscriber line ("DSL") link, integrated services digital network ("ISDN") link, Internet link, wireless link, or the like.

Communications connection 514, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 590, such as a battery or a power supply, typically provides power for portions or all of computing environment 500. In the case of the computing environment 500 being a mobile device or portable device or the like, power source 590 may be a battery. Alternatively, in the case computing environment 500 is a desktop computer or server or the like, power source 590 may be a power supply designed to connect to an alternating current ("AC") source, such as via a wall outlet.

Some mobile devices may not include many of the components described in connection with FIG. 5. For example, an electronic badge may be comprised of a coil of wire along with a simple processing unit 507 or the like, the coil configured to act as power source 590 when in proximity to a card reader device or the like. Such a coil may also be configure to act as an antenna coupled to the processing unit 507 or the like, the coil antenna capable of providing a form of communication between the electronic badge and the card reader device. Such communication may not involve networking, but may alternatively be general or special purpose communications via telemetry, point-to-point. RF, IR, audio, or other means. An electronic card may not include display 502, I/O device 503, or many of the other components described in connection with FIG. 5. Other mobile devices that may not include many of the components described in connection with FIG. 5, by way of example and not limitation include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device that includes at least one processor, memory, and a universal plug and play ("UPnP") control point, the method comprising:

evaluating, by the UPnP control point, metadata associated with a plurality of representations of a particular media content including one or more of images, movies, or music;

using the evaluation, determining an encoding bit rate for each representation;

using the evaluation, determining whether or not each representation is transcoded;

ranking, by the UPnP control point, each representation of the plurality of representations of the particular media content, based on scoring applied to the determinations for the encoding bit rate and whether each representation is transcoded;

selecting, by the UPnP control point based on the ranking, at least one of the ranked representations of the particular media content;

operating the computing device to manage utilization of available networking resources to download the particular media content within the selected representations, in which the evaluated metadata associated with the plurality of representations is utilized to select the at least one representation that is supported by the computing device or a target renderer; and rendering the selected and supported representation using the target renderer.

2. The method of claim 1 where the scoring criteria includes a comparison of the encoding bit rate for each representation to a throuput rate of a link providing the each representation.

3. The method of claim 1 where the scoring criteria further includes an indication of whether or not a multipurpose internet mail extensions ("MIME") content type of each representation is supported by the target renderer, or where the scoring criteria further includes an indication of whether or not a digital living network alliance ("DLNA") profile identifier ("ID") of each representation is supported by the target renderer.

4. The method of claim 1 where the scoring criteria further includes an indication of whether or not a real-time streaming protocol ("RTSP") is supported by the target renderer.

5. The method of claim 1 where the scoring criteria further includes an indication of whether or not a provider of each representation supports seeking.

6. The method of claim 1 where the scoring criteria further includes an indication of whether or not a hypertext transfer protocol ("HTTP") is supported by the target renderer.

7. The method of claim 1 further comprising resolving, in response to the ranking, any ties between two or more equally highest ranking representations of the plurality of representations of the particular media content.

8. A system comprising a computing device and at least one program module that are together configured for performing actions, the computing device including at least one processor, memory, and a universal plug and play ("UPnP") control point, the actions comprising:

evaluating, by the UPnP control point, metadata associated with a plurality of representations of a particular media content including one or more of images, movies, or music;

using the evaluation, determining an encoding bit rate for each representation;

using the evaluation, determining whether or not each representation is transcoded;

ranking, by the UPnP control point, each representation of the plurality of representations of the particular media content based on scoring criteria applied to the determinations for the encoding bit rate and whether each representation is transcoded; and selecting, by the UPnP control point based on the ranking, at least one of the ranked representations of the particular media content;

operating the computing device to manage utilization of available networking resources to download the particular media content within the selected representations in which the evaluated metadata associated with the plurality of representations is utilized to select the at least one representation that is supported by the computing device or a target renderer; and rendering the selected and supported representation using the target renderer.

9. The system of claim 8 where the scoring criteria includes a comparison of the encoding bit rate of each representation to a throughput rate of a link providing the each representation.

10. The system of claim 8 where the scoring criteria further includes an indication of whether or not a multipurpose internet mail extensions ("MIME") content type of each representation is supported by the target renderer, or where the scoring criteria further includes an indication of whether or not a digital living network alliance ("DLNA") profile identifier ("ID") of each representation is supported by the target renderer.

11. The system of claim 8 where the scoring criteria further includes an indication of whether or not a real-time streaming protocol ("RTSP") is supported by the target renderer.

12. The system of claim 8 where the scoring criteria further includes an indication of whether or not a provider of each representation supports seeking.

13. The system of claim 8 where the scoring criteria further includes an indication of whether or not a hypertext transfer protocol ("HTTP") is supported by the target renderer.

14. The system of claim 8, the actions further comprising resolving, in response to the ranking, any ties between two or more equally highest ranking representations of the plurality of representations of the particular media content.

15. At least one non-transitory hardware computer storage device that includes computer-executable instructions that, based on execution by a processor of a computing device that includes memory and a universal plug and play ("UPnP") control point, configure the computing device to perform actions comprising:

evaluating, by the UPnP control point, metadata associated with a plurality of representations of a particular media content including one or more of images, movies, or music;

using the evaluation, determining an encoding bit rate for each representation;

using the evaluation, determining whether or not each representation is transcoded;

ranking, by the UPnP control point, each representation of the plurality of representations of the particular media content based on scoring criteria applied to the determinations for the encoding bit rate and whether each representation is transcoded;

selecting, by the UPnP control point based on the ranking, at least one of the ranked representations of the particular media content;

operating the computing device to manage utilization of available networking resources to download the particular media content within the selected representations in which the evaluated metadata associated with the plurality of representations is utilized to select the at least one representation that is supported by the computing device or a target renderer; and rendering the selected and supported representation using the target renderer.

16. The at least one non-transitory hardware computer storage device of claim 15 where the scoring criteria includes a comparison of the encoding bit rate of each representation to a throughput rate of a link providing the each representation.

17. The at least one non-transitory hardware computer storage device of claim 15 where the scoring criteria further includes an indication of whether or not a multipurpose internet mail extensions ("MIME") content type of each representation is supported by the target renderer, or where the scoring criteria further includes an indication of whether or not a digital living network alliance ("DLNA") profile identifier ("ID") of each representation is supported by the target renderer.

18. The at least one non-transitory hardware computer storage device of claim 15 where the scoring criteria further includes an indication of whether or not a real-time streaming protocol ("RTSP") is supported by the target renderer.

19. The at least one non-transitory hardware computer storage device of claim 15 where the scoring criteria further includes an indication of whether or not a provider of each representation supports seeking, or where the scoring criteria further includes an indication of whether or not a hypertext transfer protocol ("HTTP") is supported by the target renderer.

20. The at least one non-transitory hardware computer storage device of claim 15, the actions further comprising resolving, in response to the ranking, any ties between two or more equally highest ranking representations of the plurality of representations of the particular media content.

* * * * *